United States Patent
Wu

(10) Patent No.: US 8,396,502 B2
(45) Date of Patent: Mar. 12, 2013

(54) POWER CONTROLLING METHOD AND CORRESPONDING BASE STATION

(75) Inventor: Keying Wu, Shanghai (CN)

(73) Assignee: Alcatel Lucent, Paris (FR)

( * ) Notice: Subject to any disclaimer, the term of this patent is extended or adjusted under 35 U.S.C. 154(b) by 430 days.

(21) Appl. No.: 12/670,183

(22) PCT Filed: Jul. 23, 2007

(86) PCT No.: PCT/CN2007/002232
§ 371 (c)(1),
(2), (4) Date: Jan. 22, 2010

(87) PCT Pub. No.: WO2009/012615
PCT Pub. Date: Jan. 29, 2009

(65) Prior Publication Data
US 2010/0190521 A1    Jul. 29, 2010

(51) Int. Cl.
*H04B 7/00* (2006.01)
(52) U.S. Cl. ........ 455/522; 455/67.11; 455/69; 455/135
(58) Field of Classification Search .................. 455/522, 455/67.11, 68–70, 115.3, 126, 127.1, 127.2, 455/135, 226.3, 277.2, 296; 370/318
See application file for complete search history.

(56) References Cited

U.S. PATENT DOCUMENTS

| | | | |
|---|---|---|---|
| 6,393,005 B1 * | 5/2002 | Mimura | 370/335 |
| 7,286,910 B2 * | 10/2007 | Marin-Martinod et al. | 701/3 |
| 7,391,779 B2 * | 6/2008 | Park et al. | 370/395.4 |
| 2001/0046213 A1 * | 11/2001 | Sakoda | 370/328 |
| 2003/0064744 A1 * | 4/2003 | Zhang et al. | 455/522 |
| 2003/0139196 A1 | 7/2003 | Medvedev et al. | |
| 2004/0042556 A1 | 3/2004 | Medvedev et al. | |
| 2005/0013379 A1 * | 1/2005 | Duvaut et al. | 375/259 |
| 2005/0157806 A1 * | 7/2005 | Walton et al. | 375/267 |
| 2006/0115014 A1 | 6/2006 | Jeong et al. | |
| 2006/0251156 A1 | 11/2006 | Grant et al. | |
| 2007/0223393 A1 * | 9/2007 | Urushihara et al. | 370/252 |
| 2007/0243829 A1 * | 10/2007 | Nagato et al. | 455/67.11 |
| 2008/0129367 A1 * | 6/2008 | Murata et al. | 327/355 |
| 2010/0278136 A1 * | 11/2010 | Oyman et al. | 370/330 |

FOREIGN PATENT DOCUMENTS

| | | | |
|---|---|---|---|
| CN | 1773901 A | 5/2006 | |
| WO | WO 2006/055332 A1 | 5/2006 | |

* cited by examiner

*Primary Examiner* — Dominic E Rego
(74) *Attorney, Agent, or Firm* — Fay Sharpe LLP

(57) ABSTRACT

A power controlling method and corresponding base station for controlling the transmission power of each user terminal are disclosed, in which, each user terminal is paired into virtual MIMO transmission. In the solution, first, determining the transmission power of each user terminal that makes the sum of the transmission power of each user terminal minimum under the case that the specific index for each user terminal meets a required threshold value; then, feed backing the determined transmission power of each user terminal to each user terminal. Compared with the prior art, the solution can achieve a preferable power efficiency.

20 Claims, 3 Drawing Sheets

POWER CONTROLLING METHOD AND CORRESPONDING BASE STATION

TECHNICAL FIELD

The present invention relates to the field of wireless telecommunication, and particularly, to a power controlling method and a corresponding base station.

BACKGROUND ART

Virtual MIMO is a simple method to realize multiple-input-multiple-output (MIMO) transmission in uplink direction (the direction from the user terminal to the base station), where each user terminal does not need at least two transmitting antennas and can only have one transmitting antenna. That is to say, virtual MIMO has the potential to increase the system capacity without any change (e.g., increase of the number of antennas) in the mobile user terminal side. It has already been defined as an option of uplink MIMO schemes in many future broadband wireless standards, such as WIMAX and 3GPP LTE etc.

The basic principle of virtual MIMO is that different user terminals (two or more) in the same cell transmit signals to the base station simultaneously using the same frequency and time resources. At the receiver (base station) side, the signals from different user terminals are treated in the same way as coming from different antennas of one user terminal. From the transmitter (user terminal) point of view, virtual MIMO doesn't lead to any change to mobile user terminals. From the receiver (base station) point of view, it is actually a spatial multiplexing (SM) scheme with each signal independently encoded and modulated, so the detection techniques for SM can be directly employed.

One major factor that restricts the performance of virtual MIMO is the unbalanced arrival power or arrival signal-to-noise ratios (SNRs) of different user terminals due to the different path losses related to the locations of the different user terminals (specifically, users carrying user terminals). With conventional detection techniques, such as maximum likelihood detection (MLD), minimum-mean-square-error (MMSE), and the QR decomposition and M-algorithm based MLD, unbalanced arrival power or arrival SNRs will seriously deteriorate the performance of virtual MIMO.

A traditional method to solve the above problem, namely, unbalanced arrival power or arrival signal-to-noise ratios (SNRs) of different user terminals is to increase the transmission power of user terminals with larger path loss through power control, so that the arrival power or arrival SNRs are the same for paired user terminals at base station side. However, this is not a power-efficient solution since from the water-filling theory, channels with poor conditions should transmit signals with small power levels in order to maximize the overall capacity. Moreover, such a kind of power control method may bring much interference to adjacent cells, which will lead to lower overall system capacity in low frequency reuse deployment.

Another way to avoid this problem is to carefully pair user terminals in virtual MIMO through scheduling so as to achieve balance of the arrival power or arrival SNRS at the base station side. However, such an approach will limit the number of user terminals who can work in virtual MIMO and consequently limit the system capacity.

Therefore, a solution that can overcome all of the above problems is needed.

SUMMARY OF THE INVENTION

An object of the present invention is to provide a power control solution to overcome the above problems.

According to one aspect of the present invention, a power controlling method is proposed for controlling the transmission power of each user terminal paired into virtual MIMO transmission, the method comprising the steps of: determining the transmission power of each user terminal that makes the sum of the transmission power of each user terminal minimum under the case that the specific index for each user terminal meets a required threshold value; feedbacking the determined transmission power of each user terminal to each user terminal.

In one embodiment of the present invention, the specific index and the threshold value is bit error rate or error code rate.

In one embodiment of the present invention, the specific index is arrival signal-to-noise ratio (SNR) and the threshold value is signal-to-noise ratio.

In one embodiment of the present invention, the threshold value depends on the modulating and encoding mode used by each user terminal and the bit error rate or error code rate required for each user terminal.

In one embodiment of the present invention, the threshold value is obtained offline using the Monte Carlo simulation.

In one embodiment of the present invention, the step of determining the transmission power of each user terminal that makes the sum of the transmission power of each user terminal minimum comprises: determining the arrival power of each user terminals that makes the sum of the arrival power of each user terminal minimum under the case that the specific index for each user terminal meets a required threshold value; and determining the transmission power of each user terminal according to the above-determined arrival power of each user terminal and the path loss experienced by each user terminal.

In one embodiment of the present invention, successive interference cancellation (SIC) technique is employed to detect each user terminal, and user terminals with higher arrival SNRs can be detected first.

In one embodiment of the present invention, the threshold value is signal-to-noise ratio, and the specific index is an average output SNR of the detector at each level.

In one embodiment of the present invention, interference of signals from other user terminals is considered as an additive white Gaussian noise.

In one embodiment of the present invention, interference suppression technique, such as minimum-mean-square-error MMSE, is used to deal with the interference of the signals from other user terminals.

According to another aspect of the present invention, a base station is proposed for controlling the transmission power of each user terminal paired in virtual MIMO transmission, the base station comprising: first determining means for determining the transmission power of each user terminal that makes the sum of the transmission power of each user terminal minimum under the case that the specific index for each user terminal meets a required threshold value; and feedbacking means for feeding the above-determined transmission power of each user terminal back to each user terminal.

As compared with the prior art, the present invention can achieve a better power effectiveness.

BRIEF DESCRIPTION OF THE ACCOMPANYING DRAWINGS

The other objectives and effects of the present invention will become much clearer and easier to understand with more comprehensive understanding on the present invention in conjunction with the explanations of the following accompanying drawings, wherein.

In all of the above accompanying drawings, same reference numbers represent same, similar or corresponding features or functions.

DETAILED DESCRIPTION OF PREFERRED EMBODIMENTS

The present invention provides a new power control scheme, wherein the transmission power of each user terminal paired in virtual MIMO transmission is controlled according to the following restrictions: under the case that the specific index for each user terminal meets a required threshold value, the sum of the transmission power of each user terminal is minimized. Where the specific index and the threshold value is a bit error rate or error code rate; or the specific index is arrival signal-to-noise ratio (SNR) and the threshold value is signal-to-noise ratio. The bit error rate or error code rate index and threshold value can be converted into the SNR index and threshold value. Under the circumstances that the threshold value is SNR, it can depend on the modulating and encoding mode used by each user terminals and the required bit error rate or error code rate for each user terminal.

A basic idea of the present invention is to make use of unbalanced arrival power or arrival SNR of each user terminal, rather than avoid it as the existing approach does.

In one embodiment of the present invention described herein, at the receiver (base station) side, the successive interference cancellation (SIC) technique is employed, so that user terminals with higher arrival SNRs can be detected first, and their interference can be cancelled from the received signal, which facilitates the detection of user terminals with lower arrival SNRs.

Certainly, it can be appreciated by those skilled in the art that the present invention can also employ other currently known or to-be-developed detection technologies using unbalanced arrival power of each user terminal to detect each user terminal.

Figure 1:
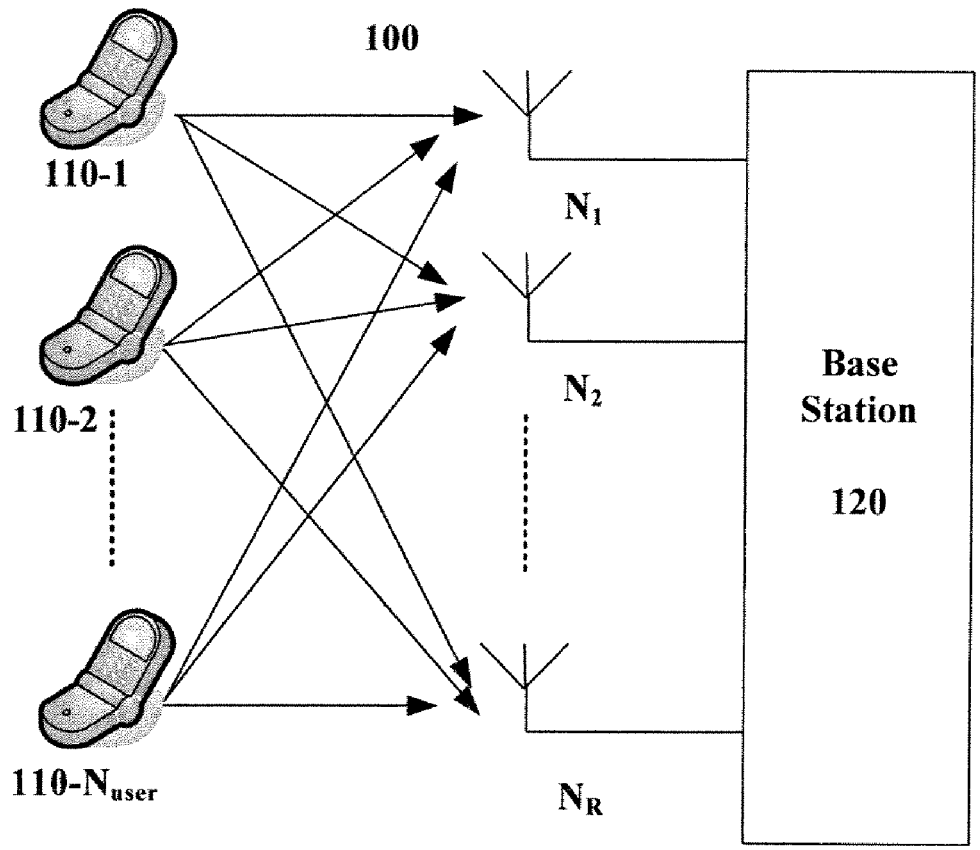
FIG. 1 shows an exemplary environment in which the present invention can be implemented.

FIG. 1 shows an exemplary environment in which the present invention can be implemented. As shown in FIG. 1, the environment 100 comprises $N_{user}$ user terminals (such as mobile phones) 110-1, 110-2, . . . , 110-$N_{user}$, and a base station 120, wherein the base station 120 comprises $N_R$ antennas.

In the environment shown in FIG. 1, all the user terminals 110-1, 110-2, . . . , 110-$N_{user}$ are in the same cell (which is controlled by the base station 120), and operate in the virtual MIMO mode, that is to say, the user terminals 110-1, 110-2, . . . , 110-$N_{user}$ transmit signals to the base station 120 with the same frequency and time resource, and with different, or partially identical and partially different, or identical modulating and encoding schemes.

The $N_R$ antennas of the base station 120 can all receive signals from user terminals 110-1, 110-2, . . . , 110-$N_{user}$.

For simplicity, in the following description assuming $N_{user}=2$, i.e., the number of user terminals paired into the virtual MIMO transmission is two.

It is noted that $N_R$ is greater than or equal to $N_{user}$.

$x_{k,t}$ denotes the signal from user terminal k at time t, $h_{k,t}^{(m)}$ denotes the channel coefficient between user terminal k and the mth receive antenna of the base station 120 at time t and can be obtained by channel measurement at the base station side. The signal transmitted by the user terminal is normalized to have a unit average power, i.e., $E(|x_{k,t}|^2)=1$ for $\forall k$ and t. The received signal in the base station 120 at time t can be expressed as $$y_t = H_t x_t + n_t = h_{1,t}\sqrt{p_1}x_{1,t} + h_{2,t}\sqrt{p_2}x_{2,t} + n_t \quad (1a)$$

where $H_t=[h_{k,t}^{(m)}]$, $x_t=[x_{1,t}\ x_{2,t}]^T$, $h_{k,t}$ is the kth column of $H_t$, $p_k$ is the transmission power of user terminal k upon transmitting signal, and $n_t$ is a $N_R \times 1$ vector with element samples of the complex additive white Gaussian noise (AWGN) process with zero-mean and variance $\sigma 2$. As will be explained later, the values of $\{p_k\}$ are designed carefully by the base station 120 to optimize the system performance, and fed back to the paired user terminals via power control.

In the equation (1a), $h_{k,t}$ is a vector of independent identically distributed (i.i.d.) complexity Gaussian random variables with zero mean and variance $\sigma_k^2$. $1/\sigma_k^2$ can be regarded as the path loss experienced by user terminal k, which varies with k due to the different locations of $N_{user}$ user terminals. Normalizing each $h_{k,t}$ by $\sigma_k$, (1a) can be rewritten as $$y_t = \tilde{h}_{1,t}\sqrt{\sigma_1^2 p_1}x_{1,t} + \tilde{h}_{2,t}\sqrt{\sigma_2^2 p_2}x_{2,t} + n_t = \tilde{h}_{1,t}\sqrt{q_1}x_{1,t} + \tilde{h}_{2,t}\sqrt{q_2}x_{2,t} + n_t \quad (1b)$$

where $q_k=p_k\sigma_k^2$ is an arrival power of the signal from each user terminal upon reaching the base station, and $\tilde{h}_{k,t}=h_{k,t}/\sigma_k$ is a vector of i.i.d. complex Gaussian random variables with a zero mean and unit variance.

Receiver Structure

In one embodiment of the present invention, at the base station side, the successive interference cancellation (SIC) technique is employed to detect the user terminals.

Figure 2:
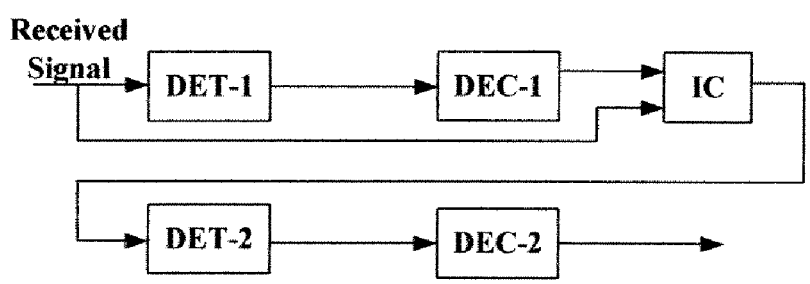
FIG. 2 illustrates a structure of a successive interference cancellation (SIC) receiver.

FIG. 2 shows the structure of the SIC receiver, where DET-k and DEC-k denote the detector and channel decoder for user terminal k, and IC denotes the interference cancellation module. For the sake of simplicity, FIG. 2 only shows two DETs and DECs of two user terminals, i.e., DET-1, DET-2 and DEC-1, DEC-2.

The successive interference cancellation (SIC) technique detects in a successive manner, starting from the user terminal with the highest arrival SNR, and performs interference cancellation after the detection of each user terminal.

Without loss of generality, we suppose that the arrival SNR of user terminal 1 is greater than the arrival SNR of user terminal 2, so detecting and decoding start from user terminal 1. The overall procedure can be summarized as follows.

1) DET-1 detects the signal from user terminal 1 from the received signal, i.e., from the above $y_t$, which includes interference from user terminal 2 and an additive white Gaussian noise.

2) DEC-1 carries out maximum a posteriori probability (APP) decoding for the channel code of user terminal 1 based on the output of DET-1.

3) IC reconstructs the signal from user terminal 1 based on the output of Step 2), and cancels it from the received signal. That is to say, in the received signal, i.e., in the above $y_t$, the signal from the user terminal 1 is cancelled and only the signal from the user terminal 2 and the additive white Gaussian noise are left.

4) DET-2 detects the signal from user terminal 2 from the signal output from IC (the interference of signal from user terminal 1 has been completely cancelled, but it further includes the additive white Gaussian noise).

5) DEC-2 carries out APP decoding for the channel code of user terminal 2 based on the output of DET-2.

In Step 1), we can either treat the interference of the signal from user terminal 2 as AWGN, or use interference suppression techniques, such as zero-forcing or MMSE, to deal with the interference of the signal from the user terminal 2. In the embodiment of the present invention, in Step 1), two methods are used to treat the interference of signal from the user terminal 2.

Method I

In this method, the interference of the signal from user terminal 2 is treated as AWGN. Multiplying both sides of the equation (1b) with $\tilde{h}_{1,t}^H$, where $(\bullet)^H$ denotes the transpose conjugate, we get $$z_t = \tilde{h}_{1,t}^H y_t = |\tilde{h}_{1,t}|^2 \sqrt{q_1} x_{1,t} + \tilde{h}_{1,t}^H (\tilde{h}_{2,t} \sqrt{q_2} x_{2,t} + n_t) = |\tilde{h}_{1,t}|^2 \sqrt{q_1} x_{1,t} + \xi_t \quad (2)$$

where $\xi_t = \tilde{h}_{1,t}^H (\tilde{h}_{2,t} \sqrt{q_2} x_{2,t} + n_t)$ is the distortion term including the signal from the user terminal 2 (which is considered as interference) and the additive white Gaussian noise.

Approximating $\xi_t$ as a Gaussian random variable, which has zero mean and variance:

$$\text{Var}(\xi_t) = q_2 |\tilde{h}_{1,t}^H \tilde{h}_{2,t}|^2 + \sigma^2 |\tilde{h}_{1,t}|^2 \quad (3)$$

where $(\bullet)^*$ denotes the conjugate. Then $z_t$ can be characterized by the following conditional probability density function $$p(z_t | x_{1,t} = \hat{x}) = \frac{1}{\sqrt{2\pi \text{Var}(\xi_t)}} \exp\left(-\frac{|z_t - |\tilde{h}_{1,t}|^2 \sqrt{q_1} \hat{x}|^2}{\text{Var}(\xi_t)}\right). \quad (4)$$

Then the maximum likelihood detection of $x_{1,t}$ is performed based on the equation (4), which is a conventional operation and is not detailed described here.

Method II

Alternatively, the optimum successive decoding (OSD) procedure can be employed to treat the interference of the signal from user terminal 2. This method will lead to better performance than Method I, but have higher detection complexity. Defining a weighting factor $$f_t = (q_2 \tilde{h}_{2,t} \tilde{h}_{2,t}^H + \sigma^2 I_{N_R})^{-1} \tilde{h}_{1,t}. \quad (5)$$

Multiplying both sides of (1b) with $f_t^H$, we get $$z_t = f_t^H y_t = f_t^H \tilde{h}_{1,t} \sqrt{q_1} x_{1,t} + f_t^H (\tilde{h}_{2,t} \sqrt{q_2} x_{2,t} + n_t) = f_t^H \tilde{h}_{1,t} \sqrt{q_1} x_{1,t} + \zeta_t. \quad (6)$$

Similarly, approximating $\zeta_t$ as a Gaussian random variable with zero mean and variance:

$$\text{Var}(\zeta_t) = |f_t^H \tilde{h}_{2,t}|^2 q_2 + |f_t|^2 \sigma^2 \quad (7)$$

The following detection procedure is the same as in Method I, i.e., calculating the conditional probability density function of $z_t$, and carrying out the maximum likelihood detection of $x_{1,t}$ based on it.

It should be noted that in the step 4), the maximum likelihood detection can also be employed to detect $x_{2,t}$ from the signal output from IC.

Power Control

In the present invention, the aim of power control is to determine a transmission power of each user terminal that makes the sum of the transmission power of each user terminal minimum under the case that the specific index for each user terminal meets a required threshold value.

According to one embodiment of the present invention as described herein, the power control operation can be implemented by three steps:

Step 1: the base station determines the arrival power of each user terminal that makes the sum of the arrival power of each user terminal minimum under the case that the specific index for each user terminal meets a required threshold value. Herein $q_{1min}$ and $q_{2min}$ denote arrival power of the user terminal 1 and user terminal 2, respectively.

Step 2: determining the corresponding transmission power $P_{1min}$ and $P_{2min}$ of the user terminal 1 and user terminal 2:

$$p_{1min} = q_{1min}/\sigma_1^2 \text{ and } p_{2min} = q_{2min}/\sigma_2^2.$$

Step 3: feeding the transmission power $p_{1min}$ and $p_{2min}$ to the user terminal 1 and user terminal 2.

In Step 2, the base station needs to know the path loss $1/\sigma_1^2$ and $1/\sigma_2^2$, which can be obtained as follows.

In the beginning of the ranging process, all user terminals transmit signals using a pre-determined transmission power. The base station measures the arrival SNR of each user terminal, and normalizes it by the pre-determined transmission power to evaluate the path loss. Then the base station indicates each user terminal to increase or decrease its transmission power according to the arrival SNR and required BER or error code rate. During the whole transmission process, the base station controls the transmission power of all user terminals in this way, so it can always track the transmission power and arrival SNR of each user terminal, and consequently, the path loss of each user terminal.

The BER or error code rate index and threshold value can be converted into the SNR index and threshold value. In this embodiment, the index is the average output SNR of each DET, and the threshold value is denoted by $snr_{required}$. The value of $snr_{required}$ depends on the required BER threshold value and the modulating and encoding mode used by each user terminal. $snr_{required}$ for each user terminal can be obtained offline using the Monte Carlo simulation. Since different user terminals may use different modulating and encoding modes and have different BER threshold values, the value of $snr_{required}$ may vary with respect to different user terminals.

In the embodiment of the present invention, it is assumed that $snr_{required}$ is the same for all user terminals. Certainly, those skilled in the art should appreciate that the present invention is not limited to this. $snr1_{DET}$ and $snr2_{DET}$ are used to denote the average output SNR of DET-1 and DET-2, respectively. $snr1_{DET}$ and $snr2_{DET}$ are both functions of $\{\tilde{h}_{k,t}\}$ and $q_1, q_2$.

In the case that the method I is used to detect signal of user terminal 1 from the received signal, $snr1_{DET}$ and $snr2_{DET}$ can be calculated as $$snr1_{DET} = E\left(\frac{|\tilde{h}_{1,t}|^4 q_1}{q_2 |\tilde{h}_{1,t}^H \tilde{h}_{2,t}|^2 + \sigma^2 |\tilde{h}_{1,t}|^2}\right), \quad (8)$$

$$snr2_{DET} = E\left(\frac{|\tilde{h}_{2,t}|^2 q_2}{\sigma^2}\right),$$

In the case that the method II is used to detect signal of user terminal 1 from the received signal, $snr1_{DET}$ and $snr2_{DET}$ can be calculated as $$snr1_{DET} = E\left(q_1 \tilde{h}_{1,t}^H (\tilde{h}_{2,t} \tilde{h}_{2,t}^H q_2 + \sigma^2 I)^{-1} \tilde{h}_{1,t}\right),$$

$$snr2_{DET} = E\left(\frac{|\tilde{h}_{2,t}|^2 q_2}{\sigma^2}\right). \tag{9}$$

where $E(\cdot)$ is the expectation over t in a frame. According to above Step 1, it is expected that the sum of the arrival power (respectively denoted by $q_{1min}$ and $q_{2min}$) of the paired user terminals is minimum, and $snr1_{DET}$ and $snr2_{DET}$ satisfy:

$$snr1_{DET} \geq snr_{required} \text{ and } snr2_{DET} \geq snr_{required} \tag{10}$$

Under slow fading channels where the channel coherence time is much larger than the frame length, the base station can predict the channel coefficients in the next frame with relatively good accuracy, so the minimums of $q_1$ and $q_2$ $q_{min1}$ and $q_{min2}$ can be calculated directly from the equation (8) or (9) and the inequation (10).

Under fast fading channels where the channel coherence time is much smaller than the frame length, the base station has difficulty to predict the exact channel coefficients in the next frame. In this case, $q_{min1}$ and $q_{min2}$ can be derived according to the following procedure. First, all possible arrival power pairs $(q_1, q_2)$ of the user terminal 1 and user terminal 2 are searched over. For each arrival power pair, the average values of $snr1_{DET}$ and $snr2_{DET}$ over all possible channel coefficients are evaluated, and if the inequation (10) can be met is checked. Second, among all the arrival power pairs that satisfy the inequation (10), the arrival power pair with the minimum total arrival power is selected. The operation only requires the base station aware of the statistical characteristic of the channel coefficients, rather than instant channel implementations, so it can be performed offline and will not cause additional complexity at the transmitter (user terminal) and receiver (base station).

It is worth mentioning that when using equation (8) or (9) and inequation (10) to calculate $q_{min1}$ and $q_{min2}$, the detection order has a large impact on the obtained minimum total arrival power. Generally speaking, it is always better to start from the user terminal with the lower path loss $1/\sigma_k^2$. This is because the user terminal detected earlier requires a higher arrival SNR to combat with the interference of signal from undetected user terminal. So the user terminal detected first should be the user terminal with better channel condition so as to reduce the required transmission power thereof.

Some simulation results are used to demonstrate the advantages of the power control scheme of the present invention. A virtual MIMO system with QPSK modulation, $N_{user}=2$ and $N_R=2$ is considered. A rate 1/3 $(11, 13)_8$ turbo code with information length 200 is used for both user terminals.

Figure 3:
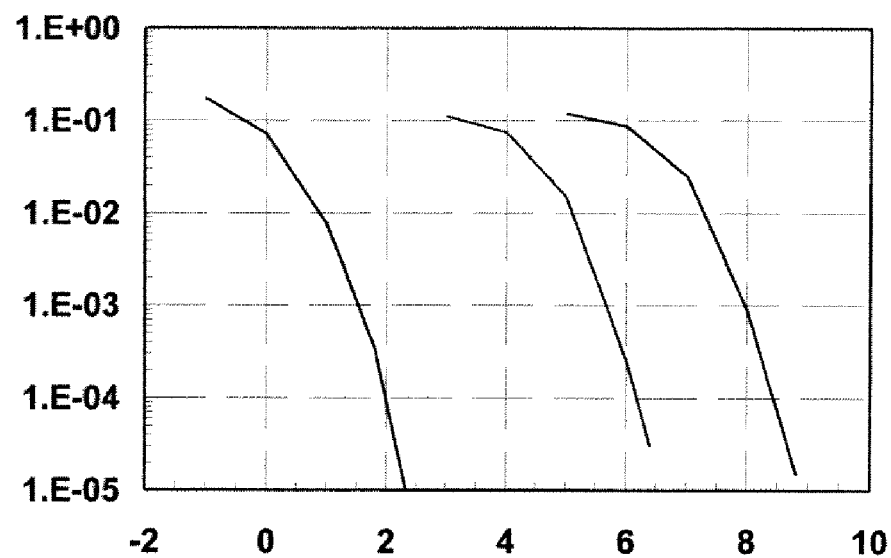
FIG. 3 shows, in a virtual MIMO system, a detrimental effect of unbalanced arrival SNRs on the performance of the virtual MIMO system.

FIG. 3 shows a detrimental effect of unbalanced arrival SNRs on the performance of such virtual MIMO system. In this figure, the x-axis denotes (p1+p2)/2σ2 (with dB as the unit), and the y-axis denotes the average BER of the two paired user terminals. In FIG. 3, we consider fast fading channels with different ratios between $\sigma_1^2$ and $\sigma_2^2$. The curve at the leftmost is obtained when $\sigma_1^2/\sigma_2^2=1$, the curve in the middle is obtained when $\sigma_1^2/\sigma_2^2=5$, and the curve at the rightmost is obtained when $\sigma_1^2/\sigma_2^2=10$. The two user terminals employ the same transmission power. At the receiver (base station) the QRM-MLD technique is employed, which can achieve similar performance as MLD with much reduced complexity. As can be seen from FIG. 3, the performance of the virtual MIMO system degrades seriously with the increase of the difference between $\sigma_1^2$ and $\sigma_2^2$.

Figure 4:
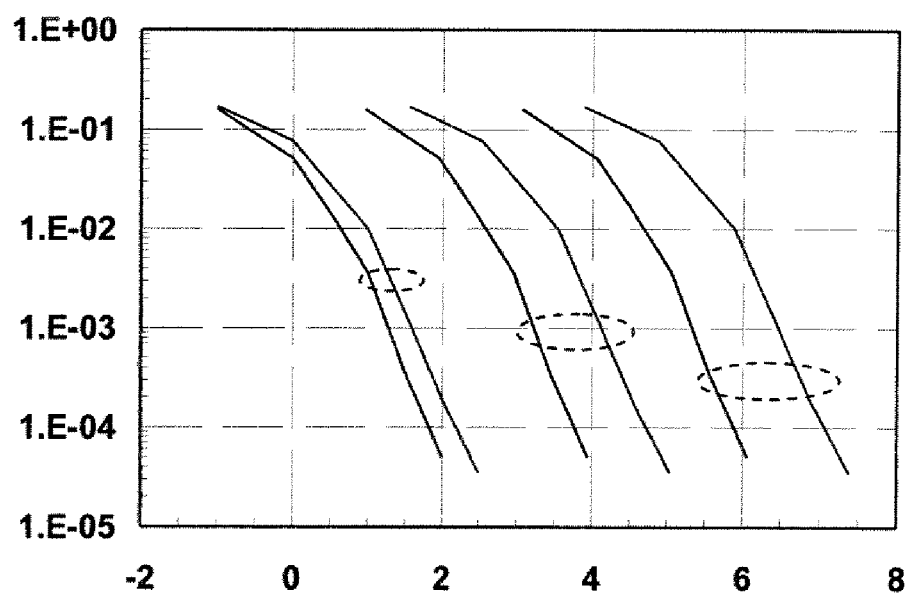
FIG. 4 shows, in a virtual MIMO system, a comparison between the proposed power control scheme and the existing one that guarantees equal arrival SNRs for user terminals by increasing the transmission power of the user terminal experiencing larger path loss.

FIG. 4 shows, in such a virtual MIMO system, a comparison between the proposed power control scheme and the existing one that guarantees equal arrival SNRs for user terminals by increasing the transmission power of the user terminal experiencing larger path loss. In FIG. 4, the x-axis denotes $(p_1+p_2)/2\sigma2$ (with dB as the unit), and the y-axis denotes the average BER of the two paired user terminals. In FIG. 4, we consider fast fading channels with different ratios between $\sigma_1^2$ and $\sigma_2^2$. The pair of curves at the leftmost is obtained when $\sigma_1^2/\sigma_2^2=1$, the pair of curves in the middle is obtained when $\sigma_1^2/\sigma_2^2=5$, and the pair of curves at the rightmost is obtained when $\sigma_1^2/\sigma_2^2=10$. The curve on the left of each pair of curves is obtained when the proposed power control scheme is employed, whereas the curve on the right is obtained when the existing scheme is employed. For the proposed power control scheme, the SIC receiver is employed with method I used in DET-1, and the values of $q_1$ and $q_2$ are selected as $q_1=0.5965Q$ and $q_2=0.4035Q$. For the existing scheme, the QRM-MLD technique is employed, and $q_1$ and $q_2$ are made equal via adjusting $p_1$ and $p_2$. As can be seen in FIG. 4, the proposed scheme in the present invention has better performance than the existing one, and the performance gain increases with the increase of the difference between $\sigma_1^2$ and $\sigma_2^2$. This advantage comes from the fact that the proposed scheme requires unbalanced arrival power for two user terminals, due to the employment of the SIC receiver, and matches the lower/higher arrival power of the user terminal with poorer/better channel conditions, which leads to less total transmission power. This can be better understood by a simple example. Considering a channel with $\sigma_1^2=1.666$ and $\sigma_2^2=0.334$, i.e., the ratio is $\sigma_1^2/\sigma_2^2 \approx 5$. For the existing power control scheme, $q_1=q_2=0.5Q$, so the total transmission power is $$P=p_1+p_2=q_1/\sigma_1^2+q_2/\sigma_2^2=0.5Q/1.666+0.5Q/0.334=1.797Q. \tag{11}$$

For the proposed power control scheme, $q_1=0.5965Q$ and $q_2=0.4035Q$, so the total transmission power is $$P=p_1+p_2=q_1/\sigma_1^2+q_2/\sigma_2^2=0.5965Q/1.666+0.4035Q/0.334=1.797Q. \tag{12}$$

Comparing (11) and (12), we can see that to achieve the same total arrival power Q, the proposed scheme of the present invention needs less transmission power.

Figure 5:
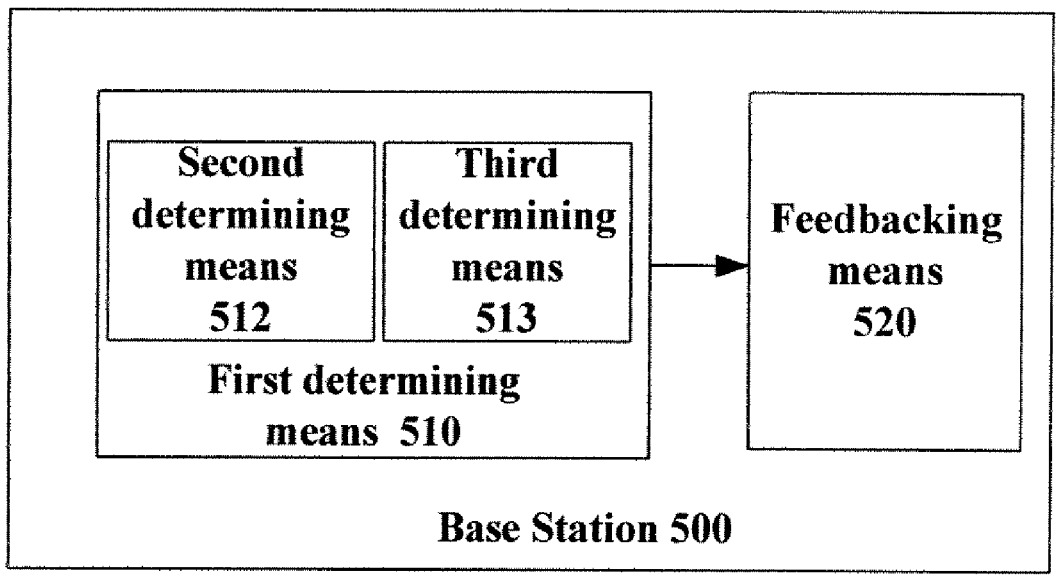
FIG. 5 is a block diagram of a base station according to one embodiment of the present invention.

FIG. 5 is a block diagram of a base station according to one embodiment of the present invention. As shown in FIG. 5, a base station 500 for controlling the transmission power of each user terminal paired in virtual MIMO transmission comprises: first determining means 510 for determining the transmission power of each user terminal that makes the sum of the transmission power of each user terminal minimum under the case that the specific index for each user terminal meets a required threshold value; and feedbacking means 520 for feeding the above-determined transmission power of each user terminal back to each user terminal.

Where the specific index and the threshold value is bit error rate or error code rate; or the specific index is arrival signal-to-noise ratio (SNR) and the threshold value is signal-to-noise ratio. The bit error rate or error code rate index and threshold value can be converted into the SNR index and threshold value. Under the circumstances that the threshold value is SNR, it can depend on a modulating and encoding mode used by each user terminal and the bit error rate or error code rate required for each user terminal.

In one embodiment of the present invention, the first determining means 510 comprises: second determining means 512 for determining the arrival power of each user terminal that makes the sum of the arrival power of each user terminal minimum under the case that the specific index for each user terminal meets a required threshold value; and third determining means 513 for determining the transmission power of each user terminal according to the above-determined arrival power of each user terminal and the path loss experienced by each user terminal.

In one embodiment of the present invention, the successive interference cancellation (SIC) technique is employed to detect each user terminal and user terminals with higher arrival SNRs can be detected first, and the threshold value is signal-to-noise ratio, and the specific index is an average output SNR of the detector at each level.

Note, in order to facilitate the easier understanding of the present invention, the foregoing description omits some technical details which are well known to those skilled in the art and which might be indispensable to the implementation of the present invention.

The specification of the present invention has been presented for purposes of illustration and description, and is not intended to be exhaustive or to limit the invention in the form disclosed. Many modifications and variations will be apparent to those of ordinary skill in the art.

Therefore, the embodiments were chosen and described in order to better explain the principles of the invention, the practical application thereof, and to enable others of ordinary skill in the art to understand that all modifications and alterations made without departing from the spirit of the present invention fall into the protection scope of the present invention as defined in the appended claims.

What is claimed is:

1. A power controlling method for controlling transmission power of user terminals operating in a virtual MIMO transmission, the method comprising:
   determining a respective transmission power of respective user terminals of the plurality that makes a sum of transmission powers of the respective user terminals of the plurality minimum under a condition that a respective specific index for respective user terminals meets a required threshold value; and
   feeding back the respective determined transmission power to the respective user terminals.

2. The method according to claim 1, wherein the specific index is bit error rate or error code rate and the threshold value is a bit error rate or an error code rate, respectively.

3. The method according to claim 1, wherein the specific index is arrival signal-to-noise ratio (SNR) and the threshold value is a signal-to-noise ratio.

4. The method according to claim 3, wherein the threshold value depends on a respective modulating and encoding mode used by the respective user terminal and the bit error rate or error code rate required for the respective user terminal.

5. The method according to claim 4, wherein the threshold value is obtained offline using a Monte Carlo simulation.

6. The method according to claim 1, wherein determining the respective transmission power of the respective user terminals that makes the sum of the transmission power of the respective user terminals minimum comprises:
   determining an arrival power of the respective user terminals that makes the sum of the arrival power of the respective user terminals minimum under the case that the respective specific index for respective user terminals meets a required threshold value; and
   determining the respective transmission power of respective user terminals according to the above-determined arrival power of the respective user terminals and respective path losses experienced by the respective user terminals.

7. The method according to claim 1, wherein a successive interference cancellation (SIC) technique is employed to detect respective user terminals, and user terminals with higher arrival SNRs can be detected first.

8. The method according to claim 7, wherein the threshold value is a signal-to-noise ratio, and the respective specific index is an average output SNR of the detector at each level.

9. The method according to claim 7, wherein interference of signals from other user terminals is considered as an additive white Gaussian noise.

10. The method according to claim 7, wherein an interference suppression technique is used to deal with the interference of the signals from other user terminals.

11. A base station for controlling the transmission power of user terminals operating in virtual MIMO transmission, the base station comprising:
    A first determiner that is operative to determine respective transmission powers of respective user terminals that makes a sum of the transmission power of the respective user terminals minimum under the condition that a respective specific index for respective user terminals meets a required threshold value; and
    transmitter for feeding the above-determined transmission power of the respective user terminals back to the respective user terminals.

12. The base station according to claim 11, wherein the specific index is bit error rate or error code rate and the threshold value is a bit error rate or an error code rate, respectively.

13. The base station according to claim 11, wherein the specific index is arrival signal-to-noise ratio (SNR) and the threshold value is a signal-to-noise ratio.

14. The base station according to claim 13, wherein the threshold value depends on a modulating and encoding mode used by the respective user terminal and the bit error rate or error code rate required for the respective user terminal.

15. The base station according to claim 14, wherein the threshold value is obtained offline using a Monte Carlo simulation.

16. The base station according to claim 11, wherein the first determiner comprises:
    A second determiner that is operative to determine the arrival power of the respective user terminals that makes the sum of the arrival power of the respective user terminals minimum under the condition that the respective specific index for the respective user terminals meets a required threshold value; and
    a third determiner that is operative to determine a transmission power of the respective user terminals according to the above-determined arrival power of the respective user terminals and path loss experienced by the respective user terminals.

17. The base station according to claim 11, wherein a successive interference cancellation (SIC) technique is employed to detect respective user terminals, and user terminals with higher arrival SNRs can be detected first.

18. The base station according to claim 17, wherein the threshold value is a signal-to-noise ratio, and the specific index is an average output SNR of the detector at each level.

19. The base station according to claim 17, wherein interference of signals from other user terminals is considered as an additive white Gaussian noise.

20. The base station according to claim 17, wherein an interference suppression technique is used to deal with the interference of the signals from other user terminals.

* * * * *